(12) United States Patent
Raychev et al.

(10) Patent No.: US 9,086,288 B2
(45) Date of Patent: Jul. 21, 2015

(54) METHOD AND SYSTEM FOR FINDING PATHS USING GPS TRACKS

(75) Inventors: Veselin Raychev, Zurich (CH); Mathilde Claire Hurand, Zurich (CH)

(73) Assignee: Google Inc., Mountain View, CA (US)

(*) Notice: Subject to any disclaimer, the term of this patent is extended or adjusted under 35 U.S.C. 154(b) by 69 days.

(21) Appl. No.: 13/184,457

(22) Filed: Jul. 15, 2011

(65) Prior Publication Data

US 2015/0168161 A1    Jun. 18, 2015

(51) Int. Cl.
  *G06F 1/00*    (2006.01)
  *G01C 21/32*   (2006.01)
  *G06F 17/30*   (2006.01)

(52) U.S. Cl.
  CPC .......... *G01C 21/32* (2013.01); *G06F 17/30241* (2013.01)

(58) Field of Classification Search
  CPC .......................... G01C 21/32; G06F 17/30241
  USPC .......................... 701/200, 400, 450, 451, 452
  See application file for complete search history.

(56) References Cited

U.S. PATENT DOCUMENTS

| 6,321,158 | B1* | 11/2001 | DeLorme et al. | 701/426 |
|---|---|---|---|---|
| 6,341,255 | B1* | 1/2002 | Lapidot | 701/420 |
| 7,512,487 | B1* | 3/2009 | Golding et al. | 701/424 |
| 8,078,393 | B2* | 12/2011 | Ohi | 701/540 |
| 2003/0134648 | A1* | 7/2003 | Reed et al. | 455/456 |
| 2004/0198395 | A1* | 10/2004 | Kimoto et al. | 455/456.1 |
| 2006/0048800 | A1* | 3/2006 | Rast et al. | 134/56 R |
| 2007/0156334 | A1* | 7/2007 | Vu | 701/209 |
| 2008/0262721 | A1* | 10/2008 | Guo et al. | 701/208 |
| 2009/0012702 | A1* | 1/2009 | Ohi | 701/200 |
| 2009/0273513 | A1* | 11/2009 | Huang | 342/357.12 |
| 2010/0161370 | A1* | 6/2010 | Bloom | 705/9 |
| 2010/0312466 | A1* | 12/2010 | Katzer et al. | 701/201 |
| 2011/0112759 | A1* | 5/2011 | Bast et al. | 701/202 |
| 2011/0179080 | A1* | 7/2011 | Miyazaki et al. | 707/772 |
| 2012/0047018 | A1* | 2/2012 | Laffey et al. | 705/14.58 |

* cited by examiner

*Primary Examiner* — Behrang Badii
*Assistant Examiner* — Daniel L Greene
(74) *Attorney, Agent, or Firm* — Dority & Manning, P.A.

(57) ABSTRACT

Systems, methods, and machine-readable media for refining mapping data are provided. One or more candidate routes may be identified based on input location coordinates of a mobile device. The one or more candidate routes may be compared to previously stored mapping data, and based on the comparison, a route score for each candidate route may be calculated. Based on the route score, a route most likely traveled by the mobile device based on the input location coordinates may be selected. The candidate route most likely traveled by the mobile device user may be analyzed to determine whether it contains a transition segment between one location coordinate and the next location coordinate in the input location coordinates that is not along a existing path known to the previously stored mapping data. The transition segment which is not part of the previously stored mapping data may be identified as a missing path of the previously stored mapping data.

20 Claims, 6 Drawing Sheets

300

400

500

600

700

METHOD AND SYSTEM FOR FINDING PATHS USING GPS TRACKS

BACKGROUND

The present disclosure generally relates to location based services and, in particular, to generating map data.

Maintaining up to date and accurate map data is important for many mapping and navigation services. Map data may, for example, be used to locate and display a point of interest on a map or find directions from one location to another. However, most efforts to generate map data are focused on finding automobile paths rather than other paths. As such, map data may be missing many paths of other types. For example, paths that are only navigable on foot or on a bicycle such as crossings, underpasses, or overpasses may be missing from the map data.

SUMMARY

According to one aspect of the subject technology, a system for refining mapping data is provided. The system may include a routing module, a scoring module, and a map module. The routing module may be configured to generate a plurality of candidate routes based on a sequence of location signals of a mobile device. The scoring module may be configured to calculate a route score for each candidate route of the plurality of candidate routes. In one aspect, the map module may be configured to select a user route from the plurality of candidate routes based on the route score for each candidate route and identify a segment in the user route as a possible missing path if the transition segment is not in the mapping data, wherein the segment in the user route links one location signal of the sequence of location signals to the next location signal.

According to another aspect of the subject technology, a method for refining mapping data is provided. The method may include identifying one or more candidate routes based on input location coordinates of a mobile device and comparing the one or more candidate routes to previously stored mapping data. The method may further include calculating a route score for each candidate route based on the comparison and selecting, based on the route score, a route most likely traveled by the mobile device based on the input location coordinates. The method may further include identifying a transition segment in the route most likely traveled by the mobile device which is not part of the previously stored mapping data as a missing path of the previously stored mapping data.

According to yet another aspect of the subject technology, a machine-readable medium including instructions stored therein, which when executed by a machine, cause the machine to perform operations for refining mapping data is provided. The operations may include generating a plurality of candidate routes based on a sequence of location signals of a mobile device and determining a route most likely traveled by the mobile device based on the sequence of location signals. The operations may also include determining whether the route most likely traveled by the location device contains a transition segment that is not in the mapping data and identifying the transition segment as a possible missing path if the transition segment is not in the mapping data.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

Figure 1:
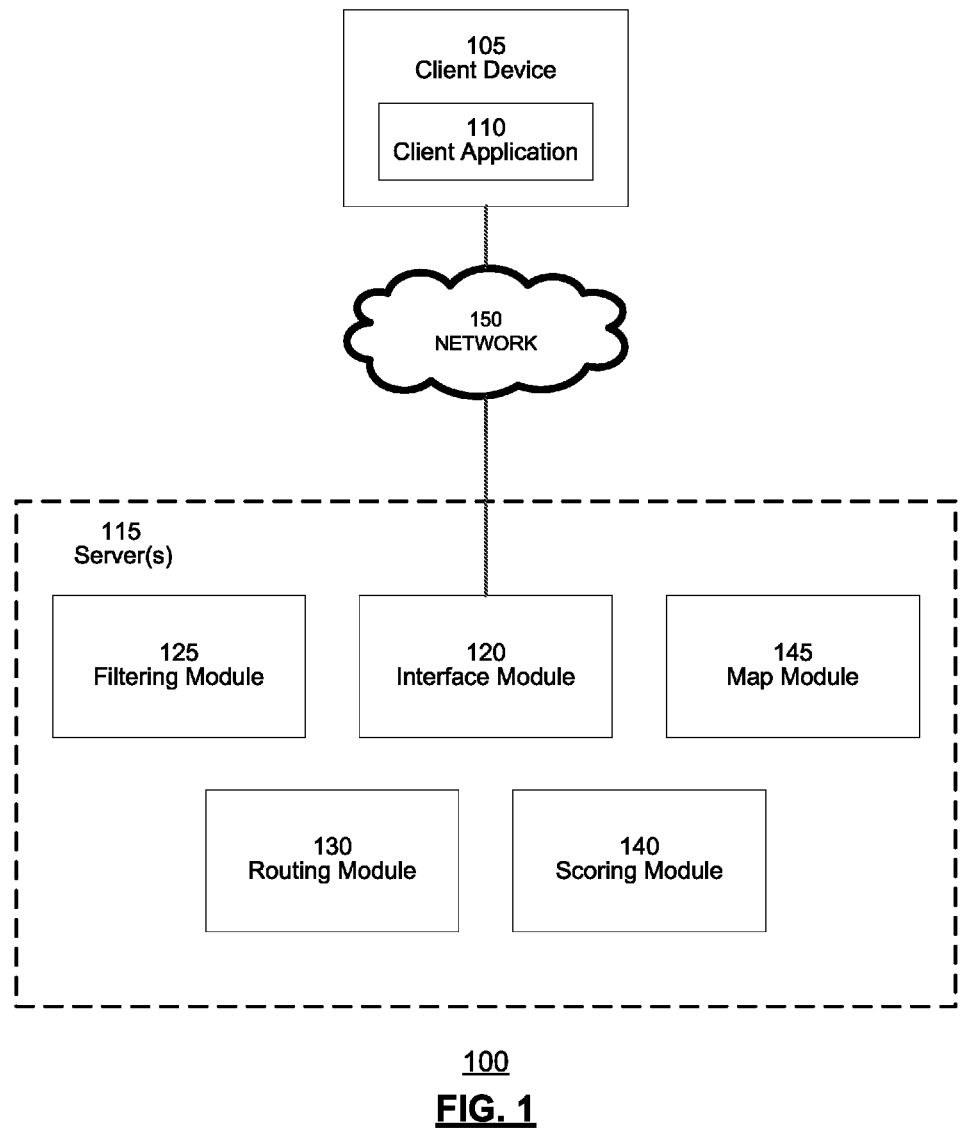
FIG. 1 is a conceptual block diagram illustrating a network environment for finding new paths using global positioning system (GPS) tracks, in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In accordance with various aspects of the subject technology, systems and methods for refining mapping data by finding new paths using a sequence of location signals (e.g., GPS signals) that include location information (e.g., location coordinates) for a mobile device. In some aspects, the sequence of location signals may be a global positioning system (GPS) track. A GPS track is an ordered set of GPS signals that includes location information (e.g., GPS coordinates) received from a mobile device of a user. For example, as a mobile device user moves from one location to another, the mobile device may transmit a series of GPS signals in a particular order that may be used to identify the route that the user traveled. In one aspect, a GPS signal may also be associated with a time (e.g., a timestamp) that indicates a time that the GPS signal was sent or received. The times associated with GPS signals may be used to place the GPS signals in proper order or to filter out unreliable GPS tracks.

A number of candidate routes may be generated by attempting to align each GPS signal in the GPS track to different path that exists on the mapping data and determining a transition or segment that links the GPS signals. Each candidate route may represent a possible route a mobile device user may have traveled that is able to produce the GPS track. A route score may be calculated for each candidate route in order to determine which candidate route a mobile device user most likely traveled.

In one aspect, the route score may be embodied as a confidence value where the candidate route with the highest confidence value may be considered the route most likely taken by the mobile device user. In another aspect, the route score may be embodied as a cost value instead of a confidence value and the candidate route with the lowest cost value may be considered the route most likely taken by the mobile device user. In certain aspects, the various scores, values, and variables used to determine which candidate route a mobile device user most likely traveled are relative to one another and may be adjusted in order to more accurately identify the candidate route most likely traveled.

The candidate route most likely taken by the mobile device user may be analyzed to determine whether it contains a transition segment between one GPS signal and the next GPS signal in the GPS track that is not along a existing path known to the mapping data. A transition segment that is not in the existing map data may indicate the presence of a path that has not been included in the existing mapping data. As a result, the transition segment may be added to the mapping data as a new path or flagged for further review and determination on whether or not to add the transition segment to the mapping data as a new path. In another aspect, flagged transition segments that are near each other may be clustered together and used to determine whether a new path should be added to the mapping data.

In certain aspects, the GPS tracks may be analyzed to determine whether the GPS tracks are of a particular type (e.g., walking, biking, driving, train, boat, etc.) and certain GPS tracks may be used to identify new paths of a particular type. For example, GPS tracks for driving, trains, and boats may be filtered out when determining whether there is a new walking path.

Although examples using global positioning system (GPS) signals, coordinates, devices, and tracks are provided, one or more other technologies may be used in addition to or instead of GPS to determine location coordinates representing a geographic location. Thus, it should be understood that location signals or location coordinates can be analyzed as discussed herein to identify paths and transition segments regardless of the technology or technologies used to determine the location signals or location coordinates.

FIG. 1 is a conceptual block diagram illustrating a network environment 100 for finding new paths using global positioning system (GPS) tracks, in accordance with various aspects of the subject technology. Although FIG. 1 illustrates a client-server network environment 200, other aspects of the subject technology may include other configurations including, for example, peer-to-peer environments or single system environments. The network environment 100 may include at least one server 115 and at least one client device 105 connected over a network 150. The client device 105 may be any machine configured to generate and transmit a GPS signal that includes location information (e.g., GPS coordinates) to the server 115. For example, client device 105 may be a mobile device (e.g., a smart phone, a tablet computer, a personal digital assistant (PDA), a global positioning system (GPS) device, etc.), or any other machine with appropriate processor, memory, and communications capabilities.

In one aspect, the client device 105 may include one or more client applications 110 (e.g., mapping applications, GPS applications, or other processes) configured to generate and transmit GPS signals to a server. The GPS signals may include GPS coordinates (e.g., longitude and latitude coordinates) and, in some cases, a time stamp indicating when the GPS signal was generated.

The network 150 can include, for example, any one or more of a cellular network, a satellite network, a personal area network (PAN), a local area network (LAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The server 115 may be any system or device having a processor, a memory, and communications capability appropriate for finding new paths using GPS tracks. In one aspect, a server 115 may be a virtual entity that might refer to a cluster or even multiple clusters of servers. The server 115 may include an interface module 120, a filtering module 125, a routing module 130, a scoring module 140, a map module 145, and one or more databases. The modules illustrated in FIG. 1 may include software instructions encoded in a medium and executed by a processor, computer hardware components, or a combination of both. For example, the modules may each include one or more processors or memories that are used to perform the functions described below. According to another aspect, the various systems and modules may share one or more processors or memories.

The interface module 120 may be configured to communicate with other systems (e.g., client devices), servers, and other modules. For example, the interface module may receive GPS signals from client devices 105. In one aspect, the interface module 120 may organize GPS signals into GPS tracks (e.g., an ordered sequence of GPS signals) received from a mobile device and store the GPS tracks in one or more databases for further analysis. The interface module 120 may organize the GPS signals into GPS tracks by storing each GPS signal received from a client device 105 in a ordered list that reflects the order in which the GPS signals were received. In another aspect, the interface module 120 may order the GPS signals based on the time stamp associated with each GPS signal.

The filtering module 125 may be configured to analyze GPS tracks generated by the interface module 120 and remove undesired GPS tracks. For example, the filtering module 125 may filter out inaccurate tracks with poor accuracy (e.g., from client devices 105 with low GPS accuracy or horizontal accuracy). The horizontal accuracy of a client device 105 that indicates a likelihood that the actual location of the client device 105 is within a distance range of the GPS coordinate being reported from that location may be one measure of GPS accuracy used by the filtering module 125 to filter out GPS tracks. In one aspect, a measure of the horizontal accuracy of the client device 105 may be provided in the GPS signals that are transmitted from the client device 105 to the interface module 120.

The filtering module 125 may also remove tracks with GPS signals that are unreliable for identifying new paths. For example, a GPS track a pair of consecutive GPS signals that have GPS coordinates more than a certain threshold distance (e.g., 200 meters) apart may be less reliable. As a result, the GPS track may filtered out and not be used for identifying new paths in the mapping data. GPS tracks with consecutive GPS signals that were transmitted or received over a certain threshold amount of time (e.g., 5 minutes apart based on their timestamps) apart may also be less reliable and, as a result, the filtering module 125 may remove these GPS tracks as well.

In another aspect, the filtering module 125 may also classify GPS tracks into tracks of a particular track type (e.g., walking, biking, driving, etc.). GPS tracks not of a desired track type may be filtered out by the filtering module 125. For example, if the system is to identify missing walking paths in the mapping data, the filtering module 125 may identify walking GPS tracks as the desired track type and filter out all other types of GPS tracks.

GPS tracks may by classified into different types by calculating a speed of travel between the GPS signals based on the distance between the location coordinates of the GPS signals and the amount of time that elapsed between one signal and another. According to one aspect, the speed for a GPS track may be the average speed between each pair of consecutive GPS signals in the GPS track (e.g., the i-th GPS signal and the (i+1)-th GPS signal in the GPS track). The filtering module 125 may then check to see if the speed is between a certain range for the desired GPS track type. For example, if a walking track is the desired track type, the filtering module 125 may determine whether the speed of a GPS track is within the walking track range (e.g., between 0.3 meters per second and 3 meters per second).

According to still another aspect, the filtering module 125 may also remove GPS tracks along paths in the mapping data that are not likely to be of the desired track type. For example, if walking track is the desired track type, GPS tracks along known highways or railways that do not allow pedestrian access may be removed. These GPS tracks may be removed even if their speed is within the desired walking track range because the detected speed may be a result of slow moving traffic.

The routing module 130 may be configured to generate candidate routes for GPS tracks by aligning each GPS signal of a GPS track to a path in the mapping data and identifying a transition segment between each pair of sequential GPS signals of the GPS track. As will be discussed in further detail below with respect to FIG. 2, each candidate route for a GPS track may be defined by an alignment of each GPS signal in the sequence of GPS signals that make up the GPS track to a point in the mapping data and transition segments joining the points according to the sequence of GPS signals.

Alignment of the GPS signals may be helpful because the GPS signals may not be entirely accurate and, as a result, mobile device users on a path may transmit GPS signals with location coordinates that are not exactly on the path. In one aspect, the candidate route is generated by aligning the GPS signals of a GPS track to the nearest path in the mapping data. In another aspect, however, more than one candidate route may be generated for a GPS track by attempting to align the GPS signals of a GPS track to all paths within a distance range (e.g., within 50 meters).

The routing module 130 may determine a transition segment based on either an absolute shortest route (e.g., the "as-the-crow-flies" route) from one GPS signal to the next GPS signal in the sequence of GPS signals of the GPS track or based on a shortest route from one GPS signal to the next GPS signal using paths in the mapping data. As will be discussed in more detail further below, the routing module 130 may determine the transition segments by comparing the distance of the absolute shortest route with the distance of the shortest route using the paths in the mapping data and determining which route a mobile device user most likely took. In one aspect, the shortest route using the paths in the mapping data may be determined based on an shortest route algorithm (e.g., a version of Dijkstra's algorithm or the A* algorithm).

The scoring module 140 may be configured to calculate a route score for each candidate route in order to determine which candidate route the mobile device user most likely took. In one aspect, the route score may be calculated based on an alignment value for each GPS signal of a GPS track and a transition value for each transition between one GPS signal and the next consecutive GPS signal in the GPS track.

The map module 145 may be configured to determine which candidate route a mobile device user most likely took based on the route scores of the candidate routes. The map module 145 may also analyze the candidate route to determine whether the candidate route most likely taken contains a transition segment between one GPS signal and the next GPS signal in the GPS track that is not in the existing mapping data. If the transition segment is not in the mapping data, the map module 145 may identify the transition segment as a possible missing path. For example, the transition segment may be added to the mapping data as a new path, flagged for further review, or clustered together with other transition segments that near each other such that the cluster may be used to determine whether a new path should be added to the mapping data.

Figure 2:
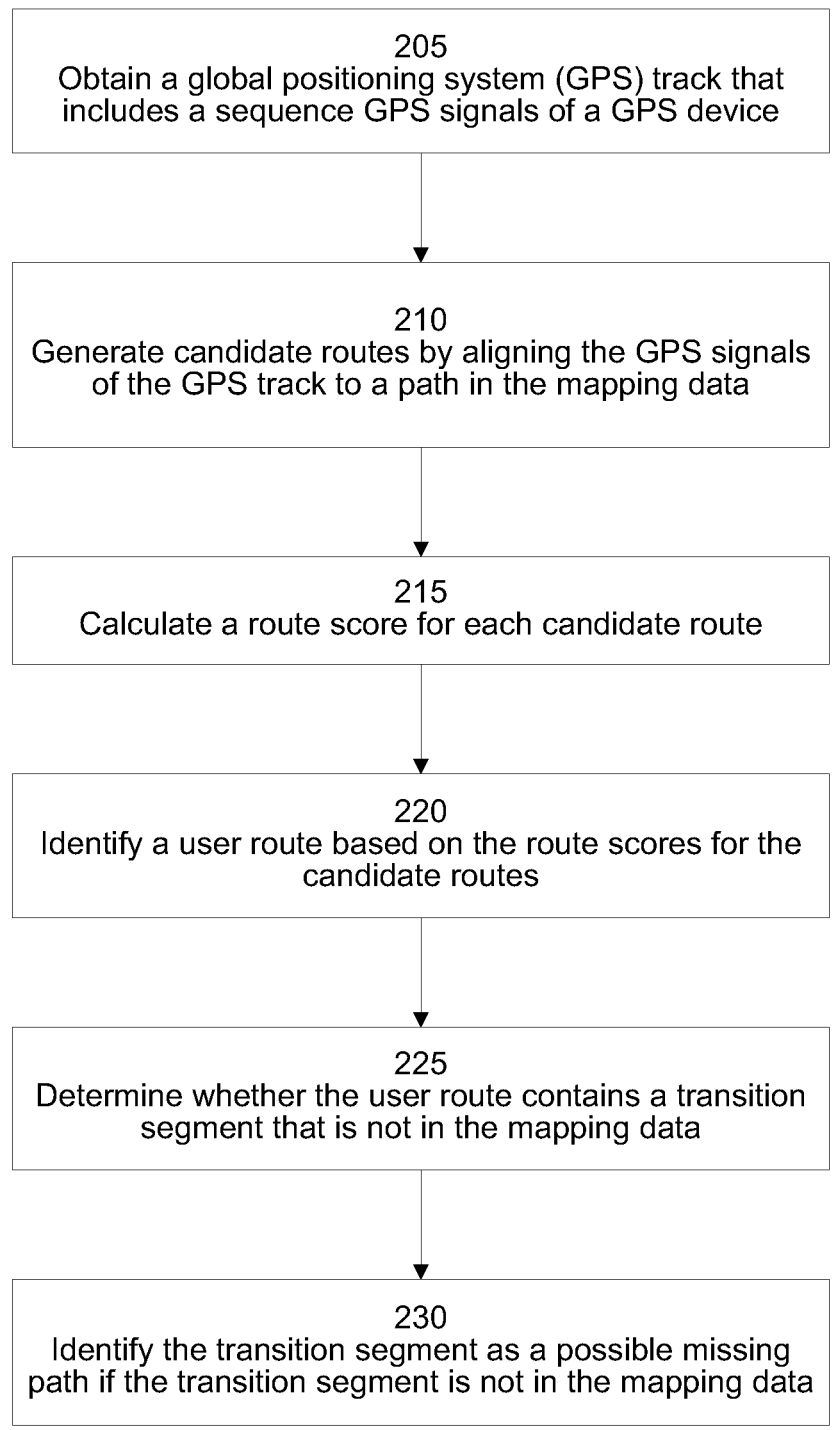
FIG. 2 is a flow chart illustrating a process for refining mapping data, in accordance with various aspects of the subject technology.

FIG. 2 is a flow chart illustrating a process 200 for refining mapping data, in accordance with various aspects of the subject technology. Although the operations in process 200 are shown in a particular order, certain operations may be performed in different orders or at the same time. Furthermore, although the description of the operations in process 200 refer to scores, values, and variables configured to maximize the route score, other aspects directed towards minimizing the route score are also envisioned.

The process 200 may begin at operation 205, where the interface module 120 obtains a GPS track that includes a sequence of GPS signals from a GPS device. The GPS track may be obtained over a period of time as the GPS device transmits the sequence of GPS signals or the interface module 120 may obtain an entire GPS track from, for example, a server or database.

In some aspects, regardless of how location data (e.g., GPS signals, location coordinates, etc.) is obtained, appropriate efforts may be taken to protect user privacy rights. For example, collection of location data may be on an opt-in basis so that data is not collected unless the user has granted permission, with the location data stored and handled in a secure manner. Additionally, steps may be taken to anonymize the location data (e.g., ensuring that the location data cannot be tied to a particular user and/or to a particular device).

Figure 3:
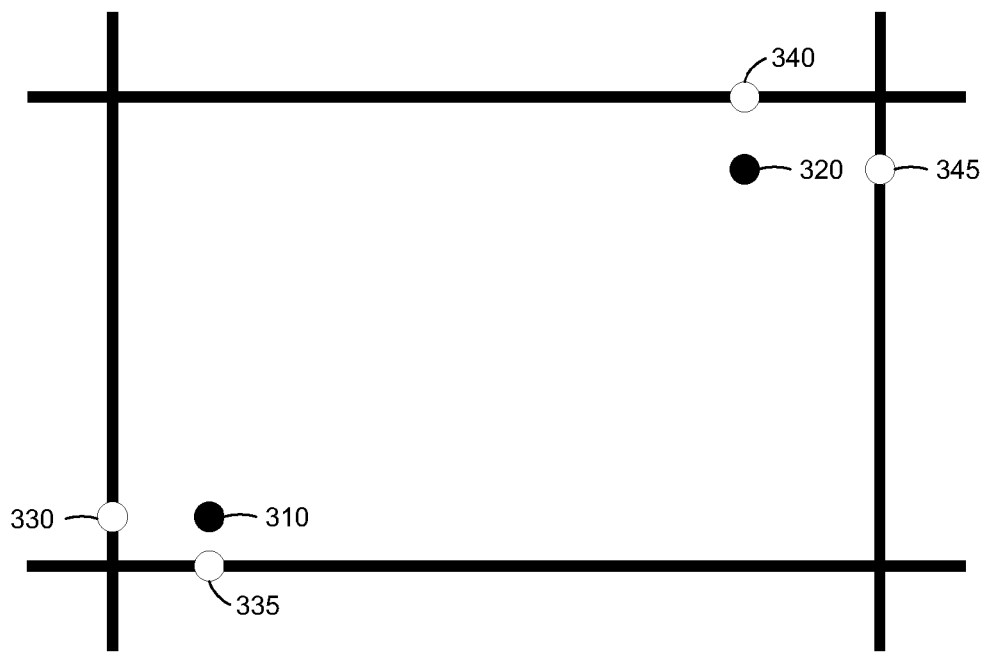
FIG. 3 is a conceptual representation of a GPS track, in accordance with one aspect of the subject technology.

As discussed above, the filtering module 125 may analyze the GPS track and filter out the track if it is not accurate, unreliable, or not of a desired track type. If a GPS track is not removed from consideration, at operation 210, the routing module 130 may generate one or more candidate routes for the GPS track by attempting to align the GPS signals of the GPS track to a path in the mapping data and determine a transition segment between each pair of sequential GPS signals in the GPS track. In order to generate multiple candidate routes, the routing module 130 may attempt to align the GPS signals to all paths in the mapping data that are within a predetermined distance. FIG. 3 illustrates a simple example of how GPS signals may be aligned to paths in the mapping data.

FIG. 3 is a conceptual representation 300 of a GPS track, in accordance with one aspect of the subject technology. The GPS track includes a sequence of two GPS signals (a first GPS signal 310 and a second GPS signal 320). The routing module 130 may align GPS signals 310 and 320 to one or more paths in the mapping data that is within a certain range (e.g., 50 meters). For example, GPS signal 310 may be aligned to a point 330 on a path in the mapping data or to a point 335 on another path in the mapping data. GPS signal 320 may be aligned to a point 340 on a path in the mapping data or to a point 345 on another path in the mapping data.

Figure 4:
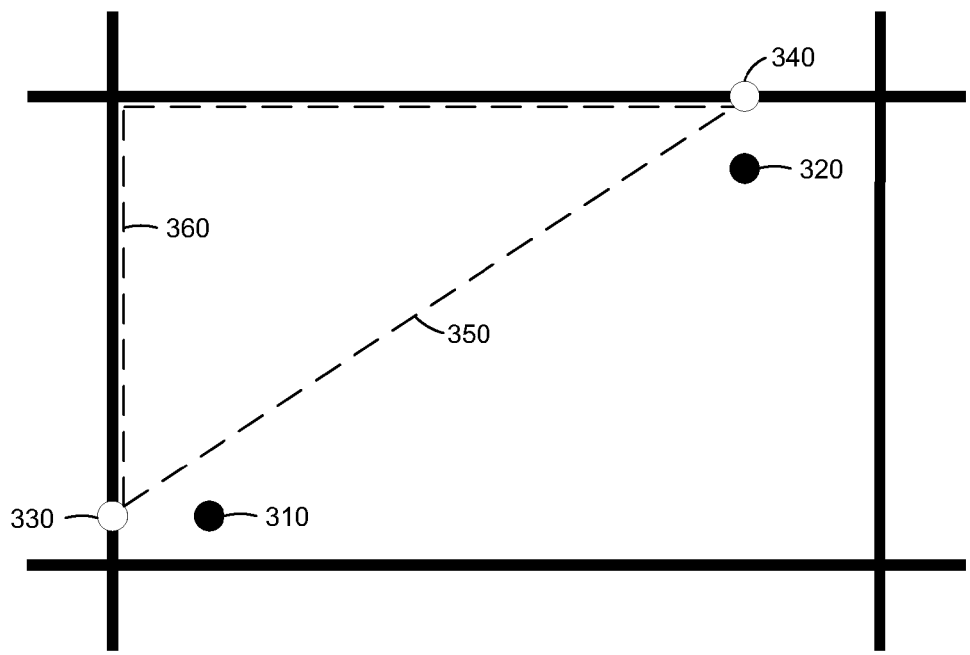
FIG. 4 is a conceptual representation of a GPS track, in accordance with one aspect of the subject technology.

After an alignment for each GPS signal in the GPS track is selected, the routing module 130 may identify transition segments between the points of alignment. The transition segments may represent the route a mobile device user most likely traveled given where the GPS signals of the GPS track were aligned. The transition segment may be generated by comparing an absolute shortest route between the sequential GPS signals and a shortest route between the signals based on the mapping data. FIG. 4 helps to illustrate how the routing module 130 determines transition segments of a candidate route based on the alignments of the GPS signals.

FIG. 4 is a conceptual representation 400 of a GPS track, in accordance with one aspect of the subject technology. In FIG. 4, the routing module 130 may have aligned the first GPS signal 310 to the point 330 and the second GPS signal 320 to the point 340. The routing module 130 may determine a transition segment for this particular set of alignments for GPS signals 310 and 320 based on a comparison between the absolute shortest route 350 (e.g., the "as-the-crow-flies" route) from the first alignment point 330 to the second alignment point 340 and the shortest route from the first alignment point 330 to the second alignment point 340 using paths in the mapping data 360 and determining which of the routes a mobile device user most likely traveled given where the GPS signals of the GPS track were aligned. In one aspect, a formula:

$$Dm > Da*K + L$$

where Dm is the distance of the shortest route according to the mapping data 360, Da is the distance of the absolute shortest route 350, and K and L are variables used to fine tune the formula (e.g., K=1.5 and L=50) may be used to determine which route the mobile device user most likely traveled based on the GPS signal alignments.

If Dm is greater than Da*K+L, then a mobile device user most likely traveled the absolute shortest route 350. If Dm is not greater than Da*K+L, then the mobile device user most likely traveled the shortest route according to the mapping data 360. Whichever route was most likely traveled by a mobile device user given the alignments of the GPS signals is identified by the routing module 130 to be the transition segment between the two GPS signals 310 and 320.

In order to generate other candidate routes, the routing module 130 may similarly determine transition segments for all other combinations of alignments of the GPS signals. For example, in FIG. 3, GPS signal 310 can be aligned with point 335 and GPS signal 320 can be aligned with point 345; GPS signal 310 can be aligned with point 330 and GPS signal 320 can be aligned with point 345; or GPS signal 310 can be aligned with point 335 and GPS signal 320 can be aligned with point 340. An example set of candidate routes that may be generated for these combination of alignments are illustrated in FIG. 5.

Figure 5:
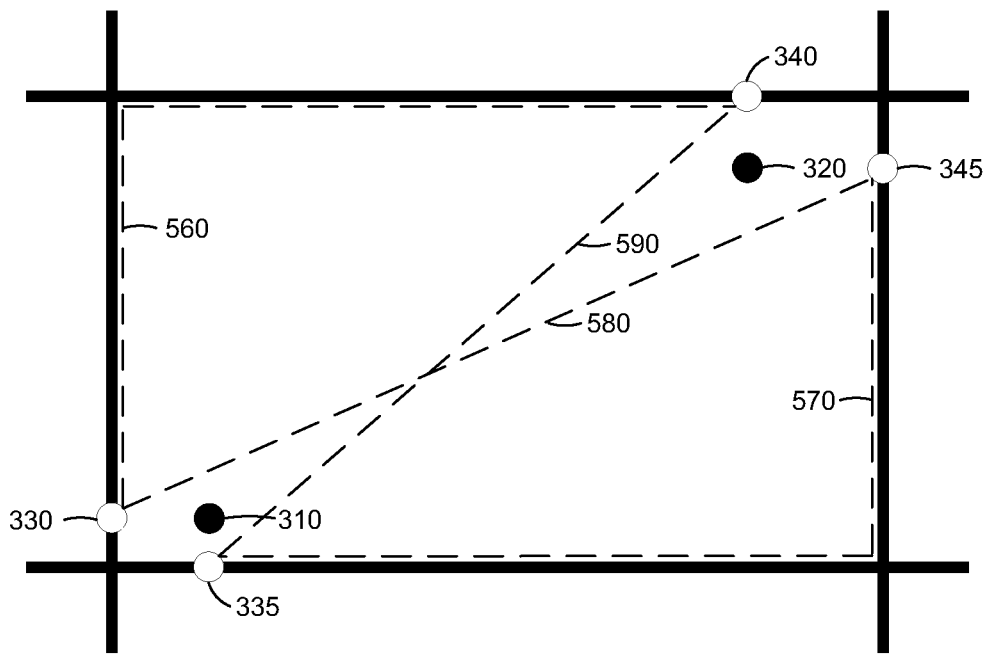
FIG. 5 is a conceptual representation of candidate routes, in accordance with one aspect of the subject technology.

FIG. 5 is a conceptual representation 500 of candidate routes, in accordance with one aspect of the subject technology. One candidate route 560 is represented by GPS signal 310 being aligned to point 330, GPS signal 320 being aligned to point 340, and transition segment from point 330 to point 340. Another candidate route 570 is represented by GPS signal 310 being aligned with point 335, GPS signal 320 being aligned with point 345, and the transition segment linking them. A third candidate route 580 is represented by GPS signal 310 being aligned with point 330, GPS signal 320 being aligned with point 345, and the transition segment linking point 330 to point 345. And a fourth candidate route 590 is represented by GPS signal 310 being aligned with point 335, GPS signal 320 being aligned with point 340, and the transition segment from point 335 to point 340.

After the candidate routes are generated, the scoring module 140 may calculate a route score for each candidate route at operation 215. The route score for each candidate route may be based on an alignment value for each GPS signal in the GPS track and a transition value for the transition segments linking the aligned points.

Figure 6:
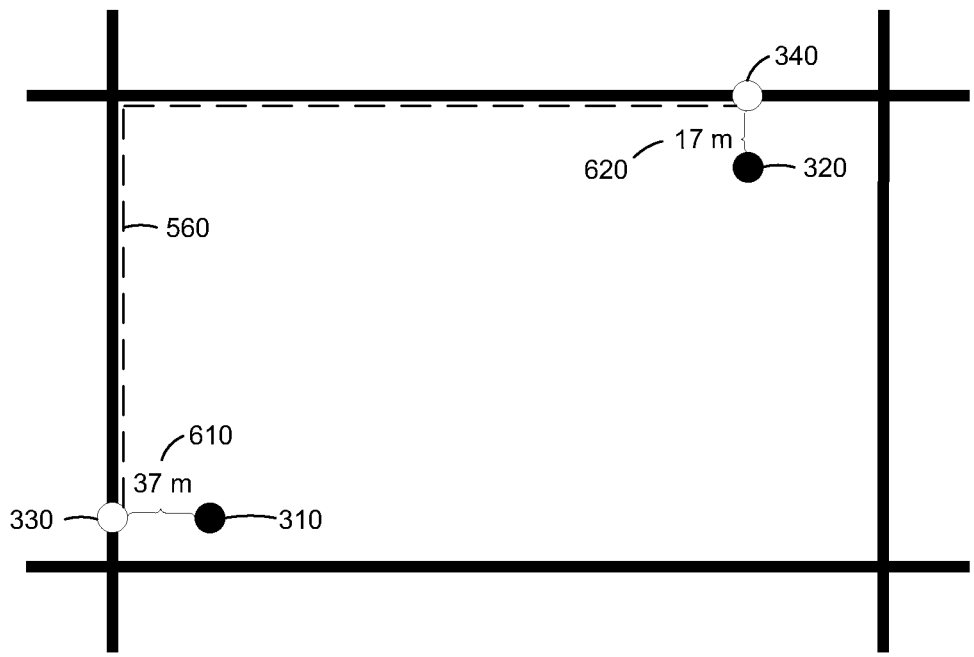
FIG. 6 is a conceptual representation of a candidate route, in accordance with one aspect of the subject technology.

The alignment value for a GPS signal may be based on the distance from the location coordinates of the GPS signal to the path to which the GPS signal was aligned. For example, FIG. 6 is a conceptual representation 600 of a candidate route 560, in accordance with one aspect of the subject technology. For candidate route 560, the alignment value for GPS signal 310 may be based on the distance 610 from GPS signal 310 to the point 330 that the GPS signal 310 is aligned to (37 meters). Similarly, the alignment value for GPS signal 320 for candidate route 560 may be based on the distance 620 between GPS signal 320 and the point 340 (17 meters). In one aspect, the alignment value may be a predetermined value (e.g., 5 meters or 0 meters) minus the distance. In another aspect, if the distance between the GPS signal and the alignment point is within a short distance of each other (e.g., 5 meters) the scoring module 140 may assume that the difference was caused by slight inaccuracies in the mobile device and assign the alignment value for the GPS signal to be 0.

Furthermore, as described above, in some aspects, the routing module 130 attempts to align GPS signals to any path within a predetermined range (e.g., 50 meters). As a result, it may be possible that there is no path within the range and the GPS signal may not be aligned. In such cases, the scoring module 140 may assign the GPS signal a predetermined alignment value for unaligned signals (e.g., −50).

A transition value for the transition segments linking the aligned points may be calculated based on whether or not the transition segment is along a path that exists in the mapping data. In one aspect, the scoring module 140 may assign one transition value to the transition segment if the transition segment is along a path that exists in the mapping data (e.g., transition value=0) and another transition value if the transition segment is not along a path that exists in the mapping data (e.g., −50). If the transition segment is to an unaligned GPS signal or from an unaligned signal, the scoring module 140 may also set the transition value to a predetermined value (e.g., −50). As discussed above, the transition segment is not along a path that exists in the mapping data if Dm is greater than Da*K+L, where Dm is the distance of the shortest route between the aligned points according to the mapping data 360 and Da is the distance of the absolute shortest route 350 between the aligned points.

Based on the alignment values for each GPS signal and the transition values for each transition segment linking the aligned points, the scoring module 140 may calculate a route score for each candidate route. In one aspect, the route score may be a sum of the alignment values and the transition values. For example, in FIG. 6, the route score for candidate route 560 may be the alignment value for GPS signal 310+the alignment value for GPS signal 320+the transition value for the transition segment linking the two points 330 and 340.

More specifically, in an aspect where the alignment value of a GPS signal is equal to 5 minus the distance between the GPS signal and the aligned point and the transition value for a transition segment along a path existing in the mapping data is 0, the route score for candidate route 560 would equal:

(5−37)+0+(5−17)=−44.

At operation 220, based on the route scores for the candidate routes generated by the routing module 130 have been calculated, the map module 145 may identify a user route that represents the route the mobile device user traveled given the GPS signals of the GPS track. For example, if the route score is embodied as a confidence value, then the candidate route with the highest confidence value may be identified as the user route. If the route score is embodied as a cost value, the calculations of the scoring module 140 may be configured to enable the map module 145 to identify the candidate route with the lowest cost value as the user route.

Figure 7:
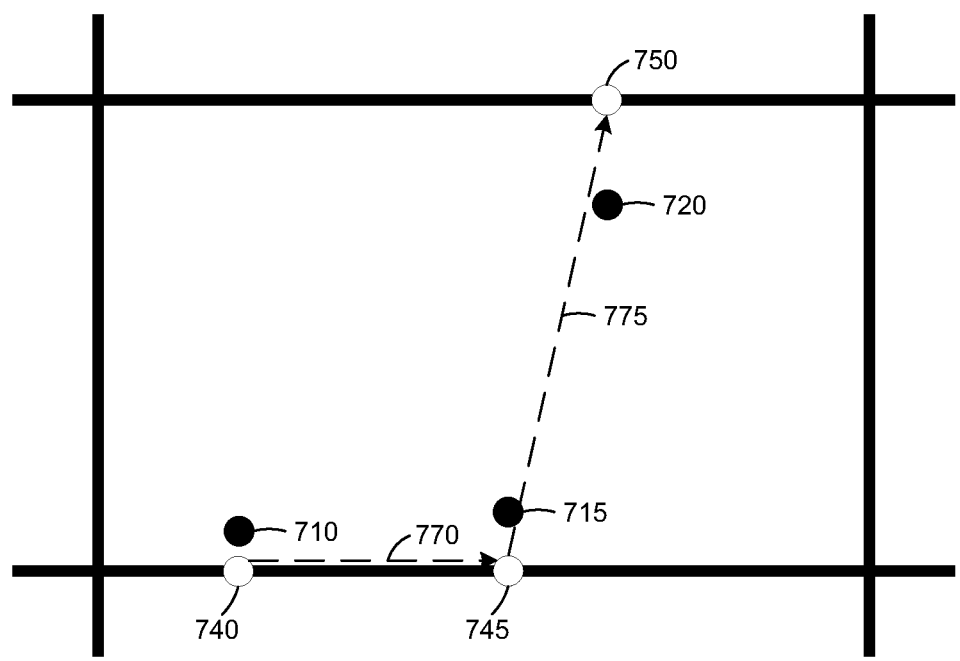
FIG. 7 is a conceptual representation of a user route, in accordance with one aspect of the subject technology.

At operation 225, the map module 145 may determine whether the user route (the route includes a transition segment that is not in the mapping data and at operation 230, the map module may identify the transition segment as a possible missing path. For example, FIG. 7 is a conceptual representation 700 of a user route, in accordance with one aspect of the subject technology. The user route (e.g., the candidate route with the highest confidence value) was generated based on a GPS track that included a sequence of 3 GPS signals 710, 715, and 720 that were aligned to points 740, 745, and 750 respectively. The points are joined together by transition segments 770 and 775. Transition segment 775 is not along a path in the mapping data and as a result, it may be a possible path missing from the mapping data.

The possible missing path may then be added to the mapping data as a new path or flagged for further review and determination on whether or not to add the transition to the mapping data as a new path. In another aspect, other missing paths that are in the same vicinity may be clustered together and used to determine, with greater reliability, whether a new path should be added to the mapping data.

Figure 8:
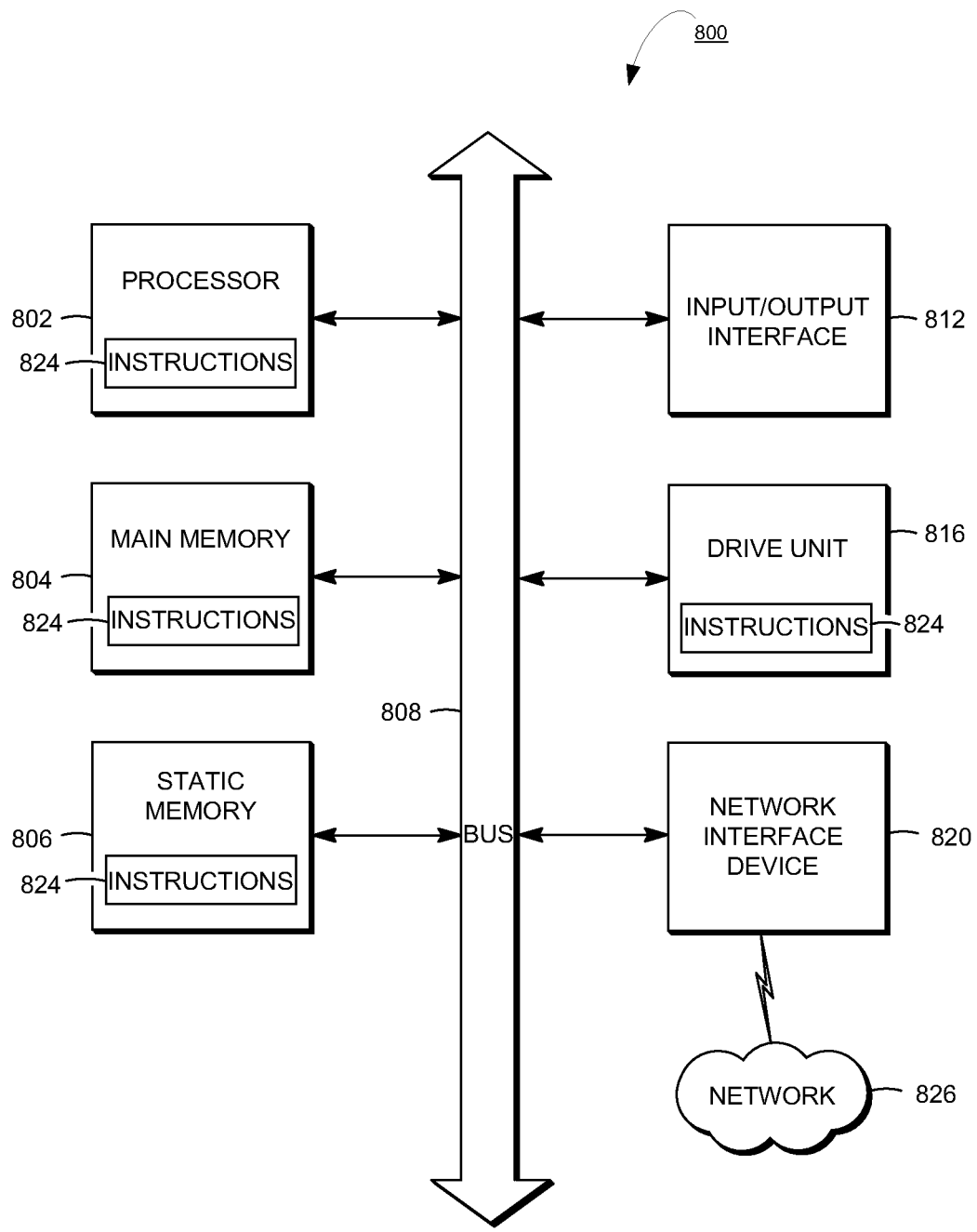
FIG. 8 is a conceptual block diagram illustrating a computer system with which each of the clients and servers of FIG. 1 may be implemented.

FIG. 8 is a block diagram illustrating a computer system with which any of the clients and servers of FIG. 1 may be implemented. In certain aspects, the computer system 800 may be implemented using hardware or a combination of software and hardware, either in a dedicated server, or integrated into another entity, or distributed across multiple entities.

The example computer system 800 includes a processor 802, a main memory 804, a static memory 806, a disk drive unit 816, and a network interface device 820 which communicate with each other via a bus 808. The computer system 800 may further include an input/output interface 812 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 802 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 824 embodying any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media. The instructions 824 may further be transmitted or received over a network 826 via the network interface device 820.

The machine-readable medium may be a single medium or multiple media (e.g., a centralized or distributed database, and/or associated caches and servers) that store the one or more sets of instructions. The machine-readable medium may include the drive unit 816, the static memory 806, the main memory 804, the processor 802, an external memory connected to the input/output interface 812, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Systems, methods, and machine-readable media for refining mapping data by finding new paths using global positioning system (GPS) tracks are provided. A number of candidate routes representing possible routes a mobile device user may have traveled in order to produce the GPS track may be generated by attempting to align each GPS signal in the GPS track to different path that exists on the mapping data. A route score may be calculated for each candidate route in order to determine which candidate route a mobile device user most likely traveled.

The candidate route most likely traveled by the mobile device user may be analyzed to determine whether it contains a transition or segment between one GPS signal and the next GPS signal in the GPS track that is not along a existing path known to the mapping data. A transition that is not in the existing map data may indicate the presence of a path that has not been included in the existing mapping data. As a result, the transition may be added to the mapping data as a new path or flagged for further review and determination on whether or not to add the transition to the mapping data as a new path. In another aspect, flagged transitions that near each other may be clustered together and used to determine whether a new path should be added to the mapping data.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for refining mapping data, the method comprising:
    receiving, at a server, input location coordinates of a mobile device, wherein the server is configured to host a memory storing mapping data, the input location coordinates corresponding to a plurality of location coordinates associated with a sequence of locations along which the mobile device has previously traveled;
    identifying one or more candidate routes based on the input location coordinates of the mobile device;
    comparing the one or more candidate routes to known paths in mapping data previously stored in the memory hosted by the server;
    using a processor at the server to:
        calculate a route score for each candidate route based on the comparison,
        select, based on the route score, a route that was most likely previously traveled by the mobile device based on the sequence of locations associated with the input location coordinates, and
        identify a transition segment in the route that was most likely previously traveled by the mobile device as a missing path of the previously stored mapping data, wherein the transition segment links one location coordinate to a next location coordinate that is not along an existing path previously stored in the mapping data; and
    adding the missing path to the mapping data stored in the memory hosted by the server.

2. The computer-implemented method of claim 1, further comprising removing the input location coordinates from consideration if the input location coordinates are associated with an accuracy measure below a threshold accuracy measure.

3. The computer-implemented method of claim 1, further comprising removing the input location coordinates from consideration if the input location coordinates contain a pair of sequential location coordinates that are more than a threshold distance apart.

4. The computer-implemented method of claim 1, further comprising removing the input location coordinates from consideration if the input location coordinates contain a pair of sequential location coordinates that are associated with timestamps that are more than a threshold amount of time apart.

5. The computer-implemented method of claim 1, further comprising:
    calculating a speed for the input location coordinates of the mobile device;
    identifying a desired track type associated with a predetermined range of speed; and
    determining whether the speed for the input location coordinates is within the predetermined range for the desired track type;
    wherein the comparing of the one or more candidate routes, the using of the processor to calculate the route score for each candidate route, to select the route that was most likely previously traveled, and to identify the transition segment, and the adding are performed if the speed for the input location coordinates is within the predetermined range for the desired track type.

6. The computer-implemented method of claim 1, further comprising:
    identifying a desired track type; and
    removing the input location coordinates from consideration if every location coordinate in the input location coordinates can be aligned with a path in the mapping data that is not associated with the desired track type.

7. The computer-implemented method of claim 1, wherein the route score is a confidence value and wherein the candidate route with the highest confidence value is selected to be the route that was most likely previously traveled by the mobile device.

8. The computer-implemented method of claim 1, wherein identifying one or more candidate routes comprises, for each candidate route:

aligning at least one location coordinate of the input location coordinates to a path in the mapping data; and determining a transition segment between each pair of sequential location coordinates in the input location coordinates.

9. The computer-implemented of claim 8, wherein the calculating of the route score for each candidate route further comprises:

calculating an alignment value for each location coordinate; and calculating a transition value for each pair of sequential location coordinates in the input location coordinates.

10. The computer-implemented of claim 9, wherein the alignment value for each location coordinate is based on the distance between the location coordinate and the point on the path in the mapping data the location coordinate is aligned to.

11. The computer-implemented method of claim 9, wherein the transition value for each pair of sequential location coordinates is based on whether the transition segment for the pair of sequential location coordinates is in the mapping data.

12. A system for refining mapping data, the system comprising:

an interface module at a server configured to receive, from a mobile device, a sequence of location signals of the mobile device associated with locations at which the mobile device has previously traveled;

a memory at the server configured to store mapping data;

a routing module configured to generate a plurality of candidate routes based on the sequence of location signals of the mobile device;

a scoring module configured to calculate a route score for each candidate route of the plurality of candidate routes; and a map module configured to:

select, from the plurality of candidate routes, a route that was most likely previously traveled by the mobile device based on the route score for each candidate route, identify a segment in the route that was most likely previously traveled by the mobile device as a possible missing path of the mapping data stored in the memory, wherein the segment links one location signal of the sequence of location signals to a next location signal that is not along an existing path previously stored in the mapping data, and add the possible missing path to the mapping data stored in the memory at the server.

13. The system of claim 12, wherein generating a plurality of candidate routes comprises, for each candidate route, attempting to align each location signal of the sequence of location signals to a point on a path in the mapping data.

14. The system of claim 13, wherein the scoring module is further configured, for each candidate route, to:

calculate an alignment value for each location signal of the sequence of location signals based on the alignment of the location signal;

calculate a transition value for each pair of consecutive location signals in the sequence of location signals; and wherein the route score for each candidate route is based on the alignment value for each location signal of the sequence of location signals and the transition value for each pair of consecutive location signals in the sequence of location signals.

15. The system of claim 12, further comprising:

a filtering module to remove the sequence of location signals from consideration if the sequence of location signals is not associated with a set of predetermined parameters.

16. The system of claim 12, wherein the map module is further configured to:

flag the possible missing path for further analysis; and group the possible missing path with other possible missing paths that are located within a predetermined distance range.

17. A non-transitory machine-readable medium comprising instructions stored therein, which when executed by a machine, cause the machine to perform operations comprising:

receiving, from a mobile device, a sequence of location signals of the mobile device associated with locations at which the mobile device has previously traveled;

generating a plurality of candidate routes based on the sequence of location signals of the mobile device;

determining a route that was most likely previously traveled by the mobile device based on the sequence of location signals;

determining whether the route that was most likely previously traveled by the location device contains a transition segment that is not in mapping data hosted by a server, wherein the transition segment links one location signal of the sequence of location signals to a next location signal that is not along an existing path previously stored in the mapping data;

identifying the transition segment as a possible missing path if the transition segment is not in any known path in the mapping data hosted by the server; and adding the possible missing path to the mapping data hosted by the server.

18. The machine-readable medium of claim 17, further comprising: removing the sequence of location signals from consideration if the sequence of location signals is not associated with a set of predetermined parameters.

19. The machine-readable medium of claim 17, wherein determining the route that was most likely previously traveled by the mobile device further comprises:

calculating a route score for each candidate route; and wherein identifying the route that was most likely previously traveled by the mobile device is based on the route scores of the plurality of candidate routes.

20. The machine-readable medium of claim 19, wherein the route score is a confidence value and wherein the route that most likely previously traveled by the mobile device is identified as the candidate route with a highest confidence value.

* * * * *